United States Patent
Ohno et al.

(10) Patent No.: US 9,891,603 B2
(45) Date of Patent: Feb. 13, 2018

(54) PROCESS CONTROL APPARATUS AND SYSTEM, AND METHOD FOR DETERMINING NORMALITY THEREOF

(71) Applicant: Yokogawa Electric Corporation, Musashino-shi, Tokyo (JP)

(72) Inventors: Takeshi Ohno, Tokyo (JP); Masanobu Tsuchiya, Tokyo (JP)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 650 days.

(21) Appl. No.: 14/336,795

(22) Filed: Jul. 21, 2014

(65) Prior Publication Data
US 2015/0032229 A1 Jan. 29, 2015

(30) Foreign Application Priority Data

Jul. 24, 2013 (JP) ................................ 2013-153875

(51) Int. Cl.
G05B 15/02 (2006.01)
G05B 19/418 (2006.01)
G05B 19/042 (2006.01)

(52) U.S. Cl.
CPC ......... *G05B 15/02* (2013.01); *G05B 19/0428* (2013.01); *G05B 19/41845* (2013.01); *Y02P 90/16* (2015.11)

(58) Field of Classification Search
CPC .. G05B 15/02; G05B 19/0428; G05B 19/042; G05B 19/0421; G05B 19/058; G05B 19/41845; Y02P 90/16
See application file for complete search history.

(56) References Cited

U.S. PATENT DOCUMENTS

2007/0078980 A1 4/2007 Tomita et al.
2008/0222632 A1 9/2008 Ueno et al.
(Continued)

FOREIGN PATENT DOCUMENTS

CN 101452406 A 6/2009
CN 102118772 A 7/2011
(Continued)

OTHER PUBLICATIONS

Zaborovsky et al., "Dynamic Access Control in Cloud Services", Systems, Man, and Cybernetics (SMC), 2011 IEEE International Conference on, IEEE, Oct. 9, 2011, pp. 1400-1404, cited in European Search Report dated May 11, 2015, issued in corresponding European Patent Application No. 14177779.7 (5 pages).
(Continued)

*Primary Examiner* — Nathan L Laughlin
(74) *Attorney, Agent, or Firm* — Westerman, Hattori, Daniels & Adrian, LLP

(57) ABSTRACT

A process control apparatus includes a hypervisor, a controller configured to run on the hypervisor and to communicate with a field apparatus to control an industrial process, an operation model definer configured to define an operation model, which is information establishing operation specifications derived from specifications of the controller, a trace information collector configured to collect traces of interactive motions between hardware and the controller, and a normality determiner configured to compare the operation model defined by the operation model definer with the information collected by the trace information collector and to determine the normality of the operation of the process control apparatus.

12 Claims, 11 Drawing Sheets

(56) References Cited

U.S. PATENT DOCUMENTS

| | | |
|---|---|---|
| 2011/0164551 A1 | 7/2011 | Takebe et al. |
| 2012/0209411 A1 | 8/2012 | Ohkado et al. |
| 2012/0210158 A1* | 8/2012 | Akiyama ............... G06F 21/554 714/2 |
| 2014/0074433 A1* | 3/2014 | Crepet ................. G05B 19/048 702/183 |
| 2015/0016286 A1* | 1/2015 | Ganichev .............. H04L 45/586 370/252 |

FOREIGN PATENT DOCUMENTS

| | | |
|---|---|---|
| JP | 2008-129714 A | 6/2008 |
| JP | 2008-225655 A | 9/2008 |
| JP | 2009-110156 A | 5/2009 |
| JP | 2009110166 A | 5/2009 |
| JP | 4399773 B2 | 1/2010 |
| JP | 2012-168755 A | 9/2012 |
| JP | 2012-230533 A | 11/2012 |
| WO | 2005/050336 A1 | 6/2005 |
| WO | 2008/149412 A1 | 12/2008 |
| WO | 2012/092124 A2 | 7/2012 |

OTHER PUBLICATIONS

"Virtualization Reduces the Cost of Supporting Open Industrial Control Systems", Jul. 1, 2009, XP055156393, Retrieved from the Internet: URL:https://www.honeywellprocess.com/library/marketing/whitepapers/HPSVirtualization Whitepaper.pdf [retrieved on Dec. 3, 2014], pp. 1-9, cited in European Search Report dated May 11, 2015, issued in corresponding European Patent Application No. 14177779.7 (11 pages).

Kallahalla et al., "SoftUDC: A Software-Based Data Center for Utility Computing", Computor, IEEE, US, Nov. 1, 2004, vol. 37, No. 11, pp. 38-46, cited in European Search Report dated May 11, 2015, issued in corresponding European Patent Application No. 14177779.7 (9 pages).

* cited by examiner

| | INPUT/OUTPUT DIRECTION | TARGET FOR SYSTEM CALL | DEVICES USED IN APPARATUS | PERIOD |
|---|---|---|---|---|
| M1 | INPUT | PROCESS CONTROL APPARATUS 20b | RD1→VD12 | RERIODIC:2sec |
| M2 | OUTPUT | MONITORING APPARATUS 30 | VD11→RD3 | RERIODIC:4sec |
| M3 | OUTPUT | VALVE APPARATUS 12 | VD13→RD2 | RERIODIC:4sec |

FIG. 5A

| INPUT/OUTPUT DIRECTION | TARGET FOR SYSTEM CALL | DEVICES USED IN APPARATUS | COLLECTION TIME |
|---|---|---|---|
| INPUT | PROCESS CONTROL APPARATUS 20b | RD1→VD12 | 00:02:10 |
| INPUT | PROCESS CONTROL APPARATUS 20b | RD1→VD12 | 00:02:12 |
| INPUT | PROCESS CONTROL APPARATUS 20b | RD1→VD12 | 00:02:14 |
| ⋮ | ⋮ | ⋮ | ⋮ |

FIG. 5B

| INPUT/OUTPUT DIRECTION | TARGET FOR SYSTEM CALL | DEVICES USED IN APPARATUS | COLLECTION TIME |
|---|---|---|---|
| OUTPUT | MONITORING APPARATUS 30 | VD11→RD3 | 00:02:10 |
| OUTPUT | MONITORING APPARATUS 30 | VD11→RD3 | 00:02:13 |
| OUTPUT | MONITORING APPARATUS 30 | VD11→RD3 | 00:02:18 |
| ⋮ | ⋮ | ⋮ | ⋮ |

FIG. 7

| | INPUT/OUTPUT DIRECTION | TARGET FOR SYSTEM CALL | DEVICES USED IN APPARATUS | COLLECTION TIME | COLLECTION LOCATION |
|---|---|---|---|---|---|
| d1 | OUTPUT | VALVE APPARATUS 12 | VD13 | 00:00'00"00 | C11 |
| d2 | OUTPUT | VALVE APPARATUS 12 | RD2 | 00:00'00"30 | C10 |
| d3 | OUTPUT | MONITORING APPARATUS 30 | VD11 | 00:00'00"30 | C11 |
| d4 | OUTPUT | MONITORING APPARATUS 30 | RD3 | 00:00'01"00 | C10 |
| d5 | INPUT | PROCESS CONTROL APPARATUS 60b | RD1 | 00:00'01"30 | C10 |
| d6 | INPUT | PROCESS CONTROL APPARATUS 60b | RD1 | 00:00'03"30 | C10 |
| d7 | OUTPUT | VALVE APPARATUS 12 | VD13 | 00:00'04"00 | C11 |
| d8 | OUTPUT | VALVE APPARATUS 12 | RD2 | 00:00'04"30 | C10 |
| | ⋮ | ⋮ | ⋮ | ⋮ | ⋮ |

FIG. 8

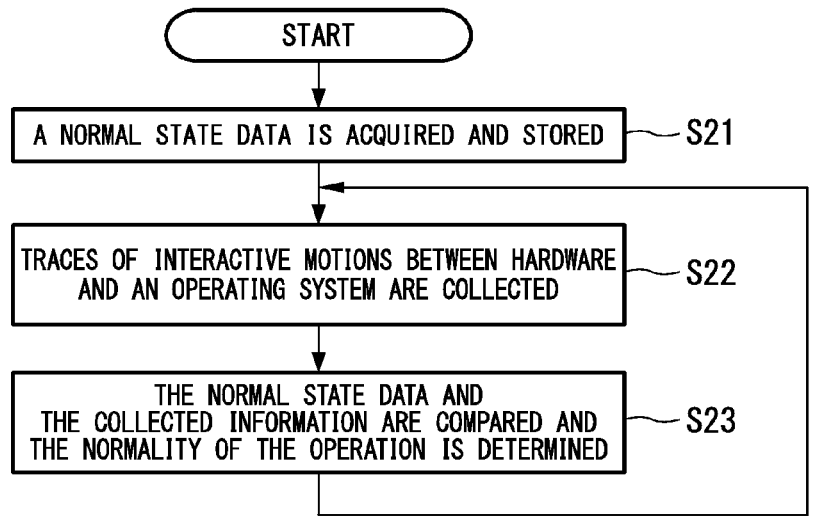

FIG. 9

| | INPUT/OUTPUT DIRECTION | TARGET FOR SYSTEM CALL | DEVICES USED IN APPARATUS | COLLECTION TIME | COLLECTION LOCATION |
|---|---|---|---|---|---|
| d11 | OUTPUT | VALVE APPARATUS 12 | VD13 | 00:00'30"00 | C11 |
| d12 | OUTPUT | VALVE APPARATUS 12 | RD2 | 00:00'30"30 | C10 |
| d13 | OUTPUT | MONITORING APPARATUS 30 | VD11 | 00:00'30"30 | C11 |
| d14 | OUTPUT | MONITORING APPARATUS 30 | RD3 | 00:00'31"00 | C10 |
| d15 | INPUT | PROCESS CONTROL APPARATUS 60b | RD1 | 00:00'31"30 | C10 |
| d16 | OUTPUT | VALVE APPARATUS 12 | VD13 | 00:00'34"00 | C11 |
| d17 | OUTPUT | VALVE APPARATUS 12 | RD2 | 00:00'34"30 | C10 |
| | ⋮ | ⋮ | ⋮ | ⋮ | ⋮ |

FIG. 12

| INPUT/OUTPUT DIRECTION | TARGET FOR SYSTEM CALL | DEVICES USED IN APPARATUS SYSTEM CALL USED IN APPARATUS | COLLECTION TIME | COLLECTION LOCATION |
|---|---|---|---|---|
| INPUT | MONITORING APPARATUS 30 | RD3 | 00:00'00"30 | C10 |
| INPUT | MONITORING APPARATUS 30 | VD11 | 00:00'00"45 | C11 |
| INPUT | MONITORING APPARATUS 30 | INTERRUPT PROCESSING | 00:00'01"00 | C21 |
| — | GENERATION PROCESSING | wakeup | 00:00'01"00 | C21 |
| — | SENSOR APPARATUS 11 | read | 00:00'02"00 | C21 |
| OUTPUT | SENSOR APPARATUS 11 | VD12 | 00:00'02"15 | C11 |
| OUTPUT | SENSOR APPARATUS 11 | RD2 | 00:00'02"30 | C10 |
| INPUT | SENSOR APPARATUS 11 | RD2 | 00:00'04"00 | C10 |
| INPUT | SENSOR APPARATUS 11 | VD12 | 00:00'04"15 | C11 |
| — | SENSOR APPARATUS 11 | read | 00:00'04"30 | C21 |
| — | MONITORING APPARATUS 30 | write | 00:00'05"00 | C21 |
| OUTPUT | MONITORING APPARATUS 30 | VD11 | 00:00'05"45 | C11 |
| OUTPUT | MONITORING APPARATUS 30 | RD3 | 00:00'06"00 | C10 |

PROCESS CONTROL APPARATUS AND SYSTEM, AND METHOD FOR DETERMINING NORMALITY THEREOF

BACKGROUND OF THE INVENTION

Field of the Invention

The present invention relates to a process control apparatus and system, and to a method for determining the normality thereof.

Priority is claimed on Japanese Patent Application No. 2013-153875, filed Jul. 24, 2013, the contents of which are incorporated herein by reference.

Description of Related Art

In a plant or a factory or the like (hereinafter, collectively simply called a "plant"), a process control system controlling various state quantities (for example, pressure, temperature, and flow amount) in an industrial process is built, and a high level of automated execution is implemented. Specifically, for example, as noted in Japanese Patent No. 4399773, PCT International Publication No. WO 2005/050336, and United States Patent Application, Publication No. 2007/0078980, a controller forming the core of a process control system acquires detection results from a plurality of sensors (flowmeters, temperature sensors, and the like), determines the actuation amounts of actuators (valves and the like) in accordance with the detection results, and operates the actuators in accordance with the actuation amounts, so as to control the various state quantities.

Although plant control systems in the related art have been built using dedicated apparatuses having unique specifications, many plant control systems in recent years are tending to be open, and are built using general-purpose apparatuses (computers, workstations, and the like) with public specifications. A plant control system using such general-purpose apparatuses, similar to general information systems, requires software improvements, such as functional expansion of operating system (OS) and applications, and correction or the like of problems and vulnerabilities of the operating system and the application.

Although process control systems in the related art have been often built independently, in order to improve productivity and the like in plants, there are increasing opportunities for plant control systems in recent years to be connected to another information systems managing, for example, production. In an environment such as this in which a process control system is connected to another information system, because a risk from external cyberattacks can be envisioned, it is important to make the software improvements (such as functional expansion of the operating system and the application, and correction or the like of problems and vulnerabilities of the operating system and the application) on a continuing basis.

Compared with a general information system, a plant control system built in a plant has the following peculiarities (1) and (2).

(1) Demand for Tight Security

Because there are many flammable chemical substances used in a plant, when a cyberattack results in unpredicted execution, in the worst case an explosion may occur. Given this, a plant control system built in a plant needs to have tighter level 2 security than a general information system. The level 2 security refers to a protection from external attacks and a protection from internal attacks. The protection from external attacks means that the control system is protected from unauthorized access of external attackers. The protection from internal attacks means that, when a part of apparatuses provided in the control system is hacked by attackers, other apparatuses provided in the control system are protected from the attack of hacked apparatus.

(2) Maintenance of Long-Term Normality Countermeasures

The life of a plant is approximately 30 years, which is a number of times the life of a general information system. It is necessary for a plant control system designed for a plant to maintain security countermeasures over a long period of time that is approximately the same as the life of the plant. For example, it is necessary to continue to obtain corrective patches to correct vulnerabilities in an operating system and applications used until the plant reaches the end of its life.

The maintenance of security countermeasures over such a long period of time is not necessarily achievable. For example, if the period during which an operating system is supported ends (if it reaches the end of service (EOS)), it becomes impossible to obtain such corrective patches. Then, there are cases in which it is impossible to correct vulnerabilities in the operating system.

When support for an operating system that has been used ends, it can be imagined that a new operating system could be introduced. However, in order to introduce a new operating system, it is necessary to verify that the same type of operation is possible as with the operating system that has been used, there are cases in which a long time is required for the verification. Also, if the operability of the newly introduced operating system changes, it is necessary to retrain users (operators), there are cases in which costs and time are required.

SUMMARY OF THE INVENTION

One aspect of the present invention provides a process control apparatus and system, and a method for determining the normality thereof, capable of maintaining tight security over a long period of time, without adopting corrective patches to correct vulnerabilities in the operating system and the application.

A process control apparatus according to one aspect of the present invention may include a controller, a storage, a first collector, and a determiner. The controller may be configured to run on hardware and a virtual device and to communicate with a field apparatus to control an industrial process implemented in a plant. The field apparatus may perform at least one of measurements and operations required for controlling the industrial process. The storage may store normal operation information indicating operations in a normal state. The first collector may be configured to collect traces of interactive motions between the hardware and the controller. The determiner may be configured to compare the normal operation information stored in the storage with information collected by the first collector to determine the normality of the operation. The operation in the normal state indicates that the process control apparatus does not exhibit operation abnormalities, such as unauthorized access from other apparatuses, and unauthorized access to other apparatuses.

In the process control apparatus described above, the storage may store an operation model, which is information establishing operation specifications derived from specifications of the controller, or first data, which are traces of interactive motions between the controller and the hardware in a normal state, as the normal operation information.

In the process control apparatus described above, if the determiner determines that the operation is not normal, the determiner may be configured to notify outside of the determination result.

In the process control apparatus described above, the controller may include an operating system configured to run on the virtual device, and an application configured to run on the operating system and to communicate with the field apparatus to control the industrial process.

The process control apparatus described above may further include a second collector configured to collect traces of interactive motions between the operating system and the application. The storage may store, in addition to the first data, second data which are traces of interactive motions between the operating system and the application in a normal state, as the normal operation information. The determiner may be configured to compare the first data with the information collected by the first collector and the second data with the information collected by the second collector to determine the normality of the operation.

In the process control apparatus described above, at least the first collector and the determiner may be provided in the virtual device.

In the process control apparatus described above, the hardware may include a plurality of processors (multi-core or a plurality of MPUs constitution). The processors may include first and second processors. The virtual device may be implemented by executing a first program for implementing the virtual device using the first processor. The controller may implemented by executing a second program for implementing the controller using the second processor, which is different from the first processor.

A process control system according to one aspect of the present invention may include a network provided in a plant, a field apparatus connected to the network and performing at least one of measurements and operations required for controlling an industrial process implemented in the plant, and a process control apparatus configured to control the industrial process and connected to the network. The process control apparatus may include a controller configured to run on hardware and a virtual device and to communicate with the field apparatus to control the industrial process, a storage storing normal operation information indicating operations in a normal state, a first collector configured to collect traces of interactive motions between the hardware and the controller, and a determiner configured to compare the normal operation information stored in the storage with information collected by the first collector to determine the normality of the operation.

The process control system according to one aspect of the present invention may further include a monitoring apparatus connected to the network and configured to receive determination results indicating whether or not the operating is normal from the process control apparatus via the network.

In the process control system described above, the storage may store an operation model, which is information establishing operation specifications derived from specifications of the controller, or first data, which are traces of interactive motions between the controller and the hardware in a normal state, as the normal operation information.

In the process control system described above, if the determiner determines that the operation is not normal, the determiner may be configured to notify the monitoring apparatus of the determination result.

In the process control system described above, the controller may include an operating system configured to run on the virtual device, and an application configured to run on the operating system and to communicate with the field apparatus to control the industrial process.

In the process control system described above, the process control apparatus may further include a second collector configured to collect traces of interactive motions between the operating system and the application. The storage may store, in addition to the first data, second data which are traces of interactive motions between the operating system and the application in a normal state, as the normal operation information. The determiner may be configured to compare the first data with the information collected by the first collector and the second data with the information collected by the second collector to determine the normality of the operation.

In the process control system described above, at least the first collector and the determiner may be provided in the virtual device. In addition, the storage may be also provided in the virtual device, if the second collector is necessary, the second collector may be provided as a module such as a library provided between the operating system and the application. Thereby, since the second collector can be implemented without changing the constitution of the existing operating system or application, the problem that there are no corrective patches to correct vulnerabilities can be addressed.

In the process control system described above, the hardware may include a plurality of processors. The processors may include first and second processors. The virtual device may be implemented by executing a first program for implementing the virtual device using the first processor. The controller may be implemented by executing a second program for implementing the controller using the second processor, which is different from the first processor.

A method for determining a normality of a process control apparatus according to one aspect of the present invention may include storing normal operation information indicating operations of the process control apparatus in a normal state. The process control apparatus may include a controller configured to run on hardware and a virtual device and to communicate with a field apparatus to control an industrial process implemented in a plant. The field apparatus may perform at least one of measurements and operations required for controlling the industrial process. The method may further include collecting traces of interactive motions between the hardware and the controller, and comparing the normal operation information with the collected traces of interactive motions between the hardware and the controller to determine the normality of the operation.

In the method for determining the normality of the process control apparatus described above, the normal operation information may include an operation model, which is information establishing operation specifications derived from specifications of the controller, or first data, which are traces of interactive motions between the controller and the hardware in a normal state.

The method for determining the normality of the process control apparatus described above may further include, if the determination is made that the operation is not normal as a result of determining the normality of the operation, notifying outside of the determination result.

In the method for determining the normality of the process control apparatus described above, the controller may include an operating system configured to run on the virtual device, and an application configured to run on the operating system and to communicate with the field apparatus to control the industrial process.

The method for determining the normality of the process control apparatus described above, may further include storing second data being traces of interactive motions between the operating system and the application in a normal state as the normal operation information and collecting traces of interactive motions between the operating system and the application. The determination of the normality of the operation may be made by comparing the first data with the collected traces of interactive motions between the hardware and the controller and comparing the second data with the collected traces of interactive motions between the operating system and the application.

In one aspect of the present invention, a first collector collects traces of interactive motions between hardware and a controller, normal operation information stored in a storage is compared with the information collected by the first collector and a determiner determines the normality of the operation. Thereby, the one aspect of the present invention enables maintenance of tight security over a long period of time, without adopting corrective patches to correct vulnerabilities of the operating system and the application.

BRIEF DESCRIPTION OF THE DRAWINGS

FIG. 5A is a table showing an example of information collected by a trace information collector in the first embodiment of the present invention.

FIG. 5B is a table showing an example of information collected by a trace information collector in the first embodiment of the present invention.

FIG. 7 is a table showing an example of data during normal operation according to the second embodiment of the present invention.

FIG. 8 is a flowchart for generally describing the operation of a process control apparatus according to the second embodiment of the present invention.

FIG. 9 is a table showing an example of information collected by a trace information collector in the second embodiment of the present invention.

FIG. 12 is a table showing an example of information collected by a trace information collector in the third embodiment of the present invention.

DETAILED DESCRIPTION OF THE INVENTION

A process control apparatus and system and a method for determining the normality thereof according to one embodiment of the present invention will be described in detail, with references made to the drawings.

First Embodiment

Figure 1:
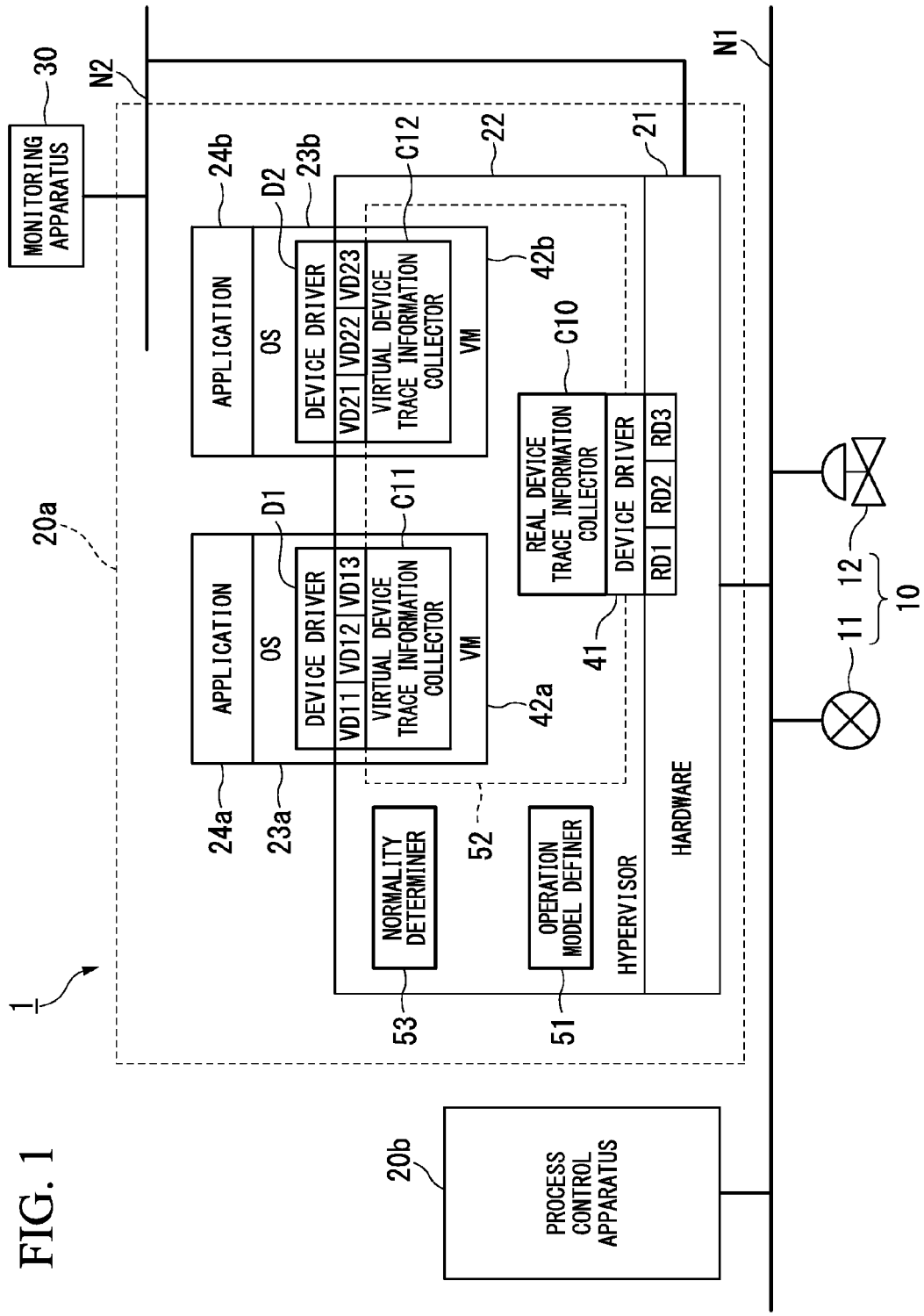
FIG. 1 is a block diagram showing the main parts of the constitution of a process control system according to a first embodiment of the present invention.

FIG. 1 is a block diagram showing the main parts of the constitution of a process control system according to the first embodiment of the present invention. As shown in FIG. 1, a process control system 1 of the first embodiment has a plurality of field apparatuses 10, process control apparatuses 20a and 20b, and a monitoring apparatus 30, and controls an industrial process implemented in a plant (not shown), by the process control apparatuses 20a and 20b controlling the field apparatuses 10, under the monitoring of the monitoring apparatus 30. In the process control system 1 of the first embodiment, a determination can be made regarding the normality of the process control apparatuses 20a and 20b (whether or not the process control apparatuses 20a and 20b exhibit abnormalities, such as unauthorized access from other apparatuses, and unauthorized access to other apparatuses).

The field apparatuses 10 and the process control apparatuses 20a and 20b are connected to a field network N1, and the process control apparatuses 20a and 20b and the monitoring apparatus 30 are connected to a control network N2. In FIG. 1, to simplify the illustration, the illustration of the connection between the process control apparatus 20b and the control network N2 is omitted. The field network N1 is, for example, a cable network laid throughout a plant, and the control network N2 is a cable network connecting, for example, an on-site location with a monitoring room of the plant. The field network N1 and control network N2 may be wireless networks.

A field apparatus 10 is, for example, a sensor apparatus such as a flow gauge or temperature sensor, a valve apparatus such as a flow amount control valve or open/close value, an actuator apparatus such as a fan or motor, or another apparatus installed on-site in a plant. In FIG. 1, as an aid to understanding, of the field apparatuses 10 installed in the plant, a sensor apparatus 11 measuring the flow amount of a fluid and a valve apparatus 12 controlling (operating) the flow amount of a fluid are illustrated.

The field apparatuses 10 operate in accordance with control data transmitted from the process control apparatuses 20a and 20b via the field network N1. For example, if a request to transmit measurement data (data indicating the results of measuring the flow amount of a fluid) is transmitted from the process control apparatus 20a to the sensor apparatus 11, the sensor apparatus 11 transmits measurement data to the process control apparatus 20a via the field network N1. If control data (data controlling the opening amount) is transmitted from the process control apparatus 20a to the valve apparatus 12, the valve apparatus 12 makes the opening of the valve through which the fluid flows be the opening instructed by the control data.

The process control apparatuses 20a and 20b perform periodic execution, under the monitoring of the monitoring apparatus 30. Periodic execution refers to execution performed by the process control apparatuses 20a and 20b with a periodic. Examples include execution to collect, with a periodic, measurement data from a field apparatus 10 (for example, the sensor apparatus 11), execution to calculate, with a periodic, control data to control a field apparatus 10 (for example, the valve apparatus 12), and execution to transmit, with periodic, control data to a field apparatus 10 (for example, the valve apparatus 12). These functionalities of the process control apparatuses 20*a* and 20*b* are implemented by software being read into a computer, with software and hardware resources operating in concert. In the following description, the functionality implemented in the process control apparatus 20*a* is given as an example.

The functionality of the process control apparatus 20*a* is implemented by hardware 21, which is formed by an MPU (microprocessing unit) and memory or the like, executing an installed program. In FIG. 1, RD1 to RD3 indicate devices (real devices) such as NICs (network interface cards) or I/O (input/output) modules. The process control apparatus 20*a* has installed therein a program that implements a hypervisor 22 (virtual device), a program that implements operating systems (OSs) 23*a* and 23*b* (controllers), and a program that implements applications 24*a* and 24*b* (controllers).

The hypervisor 22 operates virtually on the hardware 21 in place of hardware, and can have the operating system 23*a* and application 24*a* run on a virtual machine 42*a* and the operating system 23*b* and application 24*b* run on a virtual machine 42*b* each operate independently. That is, providing the hypervisor 22 enables the operating systems 23*a* and 23*b* and the applications 24*a* and 24*b* to be operated in following ways.

Running of only the operating system 23*a* and the application 24*a*

Running of only the operating system 23*b* and the application 24*b*

Running of the operating system 23*a* and application 24*a* in parallel with the operating system 23*b* and the application 24*b*

As shown in FIG. 1, the hypervisor 22 has a device driver 41, a real device trace information collector C10, and virtual machines (VMs) 42*a* and 42*b*. The device driver 41, under the control of the hypervisor 22, drives the devices RD1 to RD3 of the hardware 21. The real device trace information collector C10 traces interactive motions between the hardware 21 (devices RD1 to RD3) and the hypervisor 22.

The virtual machines 42*a* and 42*b*, under the control of the hypervisor 22, cause each of the operating systems 23*a* and 23*b* to operate. The virtual machine 42*a* has virtual devices VD11 to VD13 corresponding to the devices RD1 to RD3 of the hardware 21 and a virtual device trace information collector C11, and the virtual machine 42*b* has virtual devices VD21 to VD23 corresponding to the devices RD1 to RD3 of the hardware 21 and a virtual device trace information collector C12. The virtual device trace information collector C11 traces interactive motions between the operating system 23*a* and the virtual machine 42*a*, and the virtual device trace information collector C12 traces interactive motions between the operating system 23*b* and the virtual machine 42*b*.

The hypervisor 22 has an operation model definer 51 (storage), a trace information collector 52 (first collector), and a normality determiner 53 (determiner). If the process control apparatus 20*a* is operating normally (for example, the case in which the process control apparatus 20*a* is not under a cyberattack, there is no unauthorized access from the process control apparatus 20*a* to other apparatuses, and the process control apparatus 20*a* is operating normally), the operation model definer 51 defines an operation model (normal operation information) of the process control apparatus 20*a*, which is the operation specifications thereof, derived from the specifications of the operating systems 23*a* and 23*b* and the applications 24*a* and 24*b*. That is, operation other than operation established by the operation model can be said to be improper operation caused by operation corresponding to external unauthorized access, a virus or the like. This operation model is, for example, created and provided by the provider (system vendor) of the process control apparatus 20*a*.

Specifically, the operation model defined by the operation model definer 51, as noted below, is divided into "specifications regarding the timing of execution" and "specifications regarding the details of execution" with regard to periodic execution. Also, the latter "specifications regarding the details of execution" is divided into "control execution specifications" and "communication execution specifications".

The "specifications regarding the timing of execution" establishes timing of execution such as the interval at which periodic execution is performed and the individual execution time periods within that time interval (maximum time or minimum time). For example, the period for periodic execution is established as 1 [sec] and the execution times for input execution, calculation execution, output execution, and communication execution within that period are established as 100 [msec], 500 [msec], 50 [msec], and 100 [msec], respectively. The "specification regarding the timing of execution" may also establish the allowable error range (for example, ±10%, 1.9 sec to 2.1 sec).

The "specifications regarding the details of execution" establishes details of periodic execution and includes "control execution specifications" establishing the details of control execution and "communication execution specifications" establishing the details of communication execution. The "control execution specifications" establish the details of the control execution performed by the process control apparatus 20*a*. For example, they establish "if measurement data is input from the sensor apparatus 11, output control data to the valve apparatus 12 after the elapse of a certain amount of time." More specifically, information indicating the input/output direction of data, information indicating the transmission origin and transmission destination of data, and information indicating a device used during data input or output (the devices RD1 to RD3 or the virtual devices VD11 to VD13 and VD21 to VD23 in FIG. 1) are established. The above-noted "communication execution specifications" establish the data structure (format) of data input/output to and from the process control apparatus 20*a*, and the amount of data and the like.

Figures 2, 3:
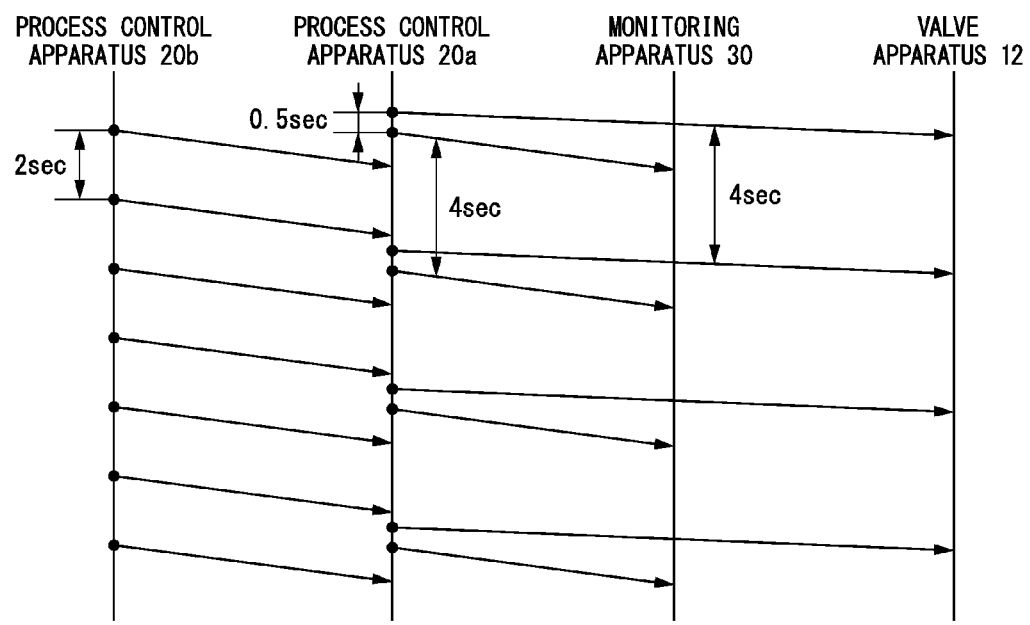
FIG. 2 is a table showing an example of operational models of a process control apparatus in the first embodiment of the present invention.
FIG. 3 is a drawing showing an example of periodic execution of a process control system performed in the first embodiment of the present invention.

FIG. 2 is a table showing an example of operation models of a process control apparatus provided in the process control system according to the first embodiment of the present invention. The operation models shown in FIG. 2 are operation models of the process control apparatus 20*a* for the case in which the periodic execution shown in FIG. 3 is performed. FIG. 3 shows an example of the periodic execution of the process control system performed by the first embodiment of the present invention. As shown in FIG. 3, the periodic execution performed in the first embodiment is the receiving by the process control apparatus 20*a* of data transmitted from the process control apparatus 20*b* at 2-sec intervals and the transmission by the process control apparatus 20*a* of data to the valve apparatus 12 and to the monitoring apparatus 30 at 4-sec intervals. The transmission of data by the process control apparatus 20*a* to the monitoring apparatus 30 is done 0.5 sec after the transmission of data from the process control apparatus 20*a* to the valve apparatus 12.

The operation models of process control apparatus shown as examples in FIG. 2 include "input/output direction", "target for system call", "devices used in apparatus", and "period". The "input/output direction" is information indicating the input/output direction of data, the "target for system call" is information indicating the target that is transmitting or receiving data, and the "devices used in apparatus" is information indicating the devices used during data input or output. The "period" is information indicating the period of the periodic execution.

For example, the operation model M1 on the first line in FIG. 2 establishes the operation of reception (input) by the device RD1 of the process control apparatus 20a of data transmitted from the process control apparatus 20b at 2-sec intervals, and the operation of transmission of the data from the device RD1 to the application 24a using the virtual device VD12 and the operating system 23a. The operation model M2 on the middle line of FIG. 2 establishes the operation of transmitting (outputting) data to the monitoring apparatus 30 at 4-sec intervals, using in sequence the virtual device VD11 and the device RD3 of the process control apparatus 20a. The operation model M3 on the lower line of FIG. 2 establishes the operation of transmitting (outputting) data to the valve apparatus 12 at 4-sec intervals, using in sequence the virtual device VD13 and the device RD2 of the process control apparatus 20a.

The trace information collector 52 includes the real device trace information collector C10 provided directly on the hypervisor 22 and the virtual device trace information collectors C11 and C12 provided in the virtual machines 42a and 42b on the hypervisor 22. The trace information collector 52 traces interactive motions between the hardware 21 and the operating systems 23a and 23b by recording and collecting the details of operations performed between the hardware 21 and the operating systems 23a and 23b. For example, the trace information collector 52 collects the records of the type of accessing devices, the type of accesses, the input/output data at the time of access, the timestamp at the time of access, the execution result of access, and the like. Although, in the first embodiment, to facilitate understanding, an example in which two virtual machines are provided is shown, a greater number of virtual machines may be provided in the hypervisor 22, and a plurality of operating systems and applications may be run. In such cases, virtual device trace information collectors corresponding to each virtual machine are provided in each virtual machine.

The normality determiner 53 compares the operation model defined by the operation model definer 51 with information collected by the trace information collector 52 and determines the normality of the process control apparatus 20a. Specifically, if the information collected by the trace information collector 52 matches the operation model defined by the operation model definer 51, the determination is that the process control apparatus 20a is in a normal state. If, however, the information collected by the trace information collector 52 does not match the operation model defined by the operation model definer 51, the determination is that the process control apparatus 20a is in an abnormal state.

If the determination is that the process control apparatus 20a is in an abnormal state, the normality determiner 53 makes a notification to that effect to the monitoring apparatus 30. If the normality determiner 53 determines that the process control apparatus 20a is in an abnormal state, the hypervisor 22 takes action so that a response is not made with respect to data that was the cause of the determination of being abnormal. For example, if the device RD2 receives data that should be received by the device RD1 of the process control apparatus 20a from the process control apparatus 20b, the normality determiner 53 determines that there is unauthorized access from the process control apparatus 20b, and then the data is discarded and not passed to the operating systems 23a and 23b.

The operating systems 23a and 23b run on the virtual machines 42a and 42b, respectively, of the hypervisor 22. For example, each performs the process management and memory management or the like necessary to run the applications 24a and 24b. A device driver D1 that drives the virtual devices VD11 to VD13 provided in the virtual machine 42a is provided in the operating system 23a, and a device driver D2 that drives the virtual devices VD21 to VD23 provided in the virtual machine 42b is provided in the operating system 23b.

The applications 24a and 24b run on the operating systems 23a and 23b, and each performs control (for example, collection of measurement data from the sensor apparatus 11 and transmission of control data to the valve apparatus 12) of the field apparatuses 10 required to perform process control. In the first embodiment, to simplify the description, the application 24a is chiefly described as controlling the field apparatuses 10.

The monitoring apparatus 30 is implemented, for example, by a computer, and is executed by an operator and used to monitor a process. Specifically, the monitoring apparatus 30 monitors and manages the operating states of the operating systems 23a and 23b and the applications 24a and 24b running on the process control apparatus 20a, and, in accordance with the results of that monitoring and the like (or in accordance with execution instructions from an operator) controls the process control apparatus 20a. Also, the monitoring apparatus 30 receives the results of determination notified from the process control apparatus 20a via the control network N2 (determination results indicating whether or not the operating state of the process control apparatus 20a is normal).

Figure 4:
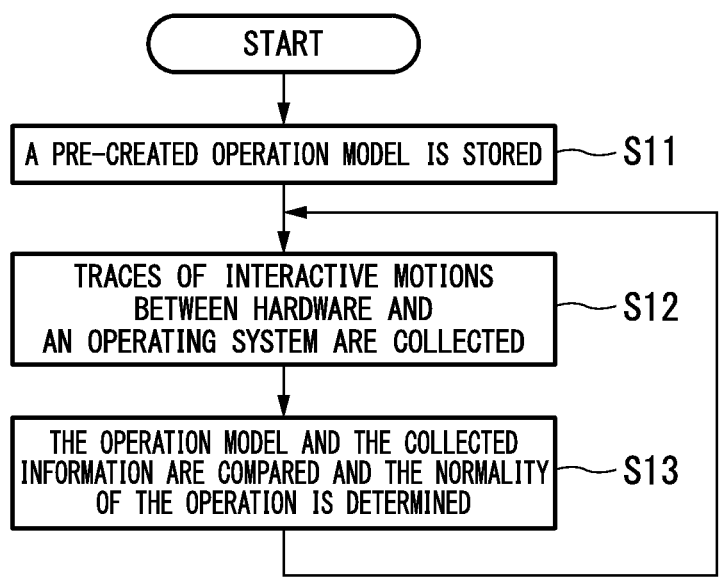
FIG. 4 is a flowchart for generally describing the operation of the process control apparatus according to the first embodiment of the present invention.

Next, the operation of the process control system 1 having the above-noted constitution will be described. FIG. 4 is a flowchart for describing the general operation of a process control apparatus provided in a process control system according to the first embodiment of the present invention. First, as shown in FIG. 4, a pre-created operation model (operation specifications of the process control apparatus 20a derived from the specifications of the operating systems 23a and 23b and the applications 24a and 24b) is stored in the operation model definer 51 of the hypervisor 22 (step S11: first step). The task of storing the operation model into the operation model definer 51 is performed, for example, when the builder of the application installs a program for implementing the applications 24a and 24b into the operating systems 23a and 23b, or immediately after completing the setting (engineering) of the applications 24a and 24b after they are installed.

When the above operations are completed, the trace information collector 52 of the process control apparatus 20a performs execution to collect traces of interactive motions between the hardware 21 and the operating system 23a when the application 24a is running (step S12: second step). Specifically, the real device trace information collector C10 collects traces of interactive motions between the hardware 21 and the hypervisor 22, and the virtual device trace information collector C11 collects traces of interactive motions between the operating system 23a and the virtual machine 42a.

Then, the normality determiner 53 compares the operation model defined by the operation model definer 51 with the information collected by the trace information collector 52 and determines the normality of the process control apparatus 20a (step S13: third step). Specifically, if the information collected by the trace information collector 52 matches the operation model defined by the operation model definer 51, the normality determiner 53 determines that the process control apparatus 20a is in a normal state. If, however, the information collected by the trace information collector 52 does not match the operation model defined by the operation model definer 51, the normality determiner 53 determines that the process control apparatus 20a is in an abnormal state.

In the event that the process control apparatus 20a is determined to be in an abnormal state, the hypervisor 22, for example, discards the data received at the process control apparatus 20a or the data that is to be transmitted from the process control apparatus 20a. Doing this, the hypervisor 22 functions as a so-called firewall, to prevent received improper data from being passed to the operating system 23a, and also prevent improper data from being transmitted to outside. If the process control apparatus 20a is determined to be in an abnormal state, the process control apparatus 20a makes notification to that effect to the monitoring apparatus 30. Thereafter, the process control apparatus 20a repeats execution of steps S12 and S13.

FIGS. 5A and 5B are tables showing examples of information collected by the trace information collector 52 in the first embodiment of the present invention, FIG. 5A showing an example of information collected when data is input to the process control apparatus 20a, and FIG. 5B showing an example of information collected when data is output from the process control apparatus 20a. As shown in FIGS. 5A and 5B, the information collected by the trace information collector 52, in addition to information indicating the "input/output direction", "target for system call", and "devices used in apparatus" as in the operation model of the process control apparatus 20a shown in FIG. 2, has "collection time" (timestamp) indicating the time that the information was collected.

As shown in FIG. 3, if data sent from the process control apparatus 20b at 2-sec intervals is received by the process control apparatus 20a, the trace information collector 52 collects information, for example, such as shown in FIG. 5A. Specifically, in addition to information indicating that "input/output direction" is input, that "target for system call" is the process control apparatus 20b, and that "devices used in apparatus" is from the device RD1 to the virtual device VD12, the time that the tracing is performed ("collection time") is collected. In the example shown in FIG. 5A, note that the difference between one "collection time" and the next is 2 sec.

When the process control apparatus 20a receives data from the process control apparatus 20b, the normality determiner 53 compares the information shown in FIG. 5A with the operation model M1 shown in FIG. 2 and determines the normality of the communication of process control apparatus 20a with the process control apparatus 20b. In the example shown in FIG. 5A, information indicating "input/output direction", "target for system call", and "devices used in apparatus" match, respectively, with the "input/output direction", "target for system call", and "devices used in apparatus" of the operation model M1 of FIG. 2. The difference between one "collection time" and the next in FIG. 5A is within the range established for "period" in the operation model M1 of FIG. 2. For this reason, it can be said to match the operation model, and if the information shown by example in FIG. 5A is collected, the normality determiner 53 determines that the communication of process control apparatus 20a with the process control apparatus 20b is normal.

In contrast, as shown in FIG. 3, if the process control apparatus 20a transmits data to the monitoring apparatus 30 at 4-sec intervals, the trace information collector 52 collects, for example, the information shown in FIG. 5B. Specifically, in addition to information indicating that "input/output direction" is output, that "target for system call" is the monitoring apparatus 30, and that the "devices used in apparatus" is routing from the virtual device VD11 to the device RD3, the time that the tracing was performed ("collection time") is collected. In the example shown in FIG. 5B, note that the difference between one "collection time" and the next is not fixed, and is 3 sec or 5 sec.

If data is transmitted from the process control apparatus 20a to the monitoring apparatus 30, the normality determiner 53 compares the information shown in FIG. 5B with the operation model M2 of FIG. 2 and determines the normality of the process control apparatus 20a. In the example shown in FIG. 5B, information indicating the "input/output direction", "target for system call", and "devices used in apparatus" match, respectively, with the "input/output direction", "target for system call", and "devices used in apparatus" of the operation model M2 of FIG. 2. However, the difference between one "collection time" and the next in FIG. 5B is not fixed, and is outside the range set forth for the "period" of the operation model M2 of FIG. 2. For this reason, there can be said to be no match with the operation model, and, if information shown by example in FIG. 5B is collected, the normality determiner 53 determines that the operating of the operating system 23a or the application 24a in the process control apparatus 20a is not normal.

In the above, to simplify the description, the operation model defined by the operation model definer 51 is described as being made up of "input/output direction", "target for system call", "devices used in apparatus", and "period". However, in addition to these, by using an operation model that establishes the "communication execution specifications", such as the data structure (format), the communication timing, and the amount of data or the like, it is possible to determine the normality of the process control apparatus 20a with better accuracy.

As described above, in the first embodiment, the operation model, which is operation specifications of the process control apparatus 20a derived from the specifications of the operating systems 23a and 23b and the applications 24a and 24b, is defined, this defined model is compared with information collected by the trace information collector 52 (traces of interactive motions between the hardware 21 and the operating system 23a), and a determination is made as to the normality of the operation of the process control apparatus 20a. Execution is then performed for, for example, discarding of the data, based on the result of the determination.

Also, in the first embodiment, the operation model, which indicates dynamic operations, performs the same type of role as a whitelist, which indicates a list of static information. Because the normality of the operation of the process control apparatus 20a is determined by judging whether or not the information collected by the trace information collector 52 matches an operation model, it is possible to determine the normality of the process control apparatus 20a, regardless of whether or not an unauthorized access from outside or a virus is known or unknown. Additionally, in the first embodiment, because the hypervisor 22 functions as a so-called firewall, even if there is an improper action that takes advantage of a vulnerability of the operating systems 23a and 23b and the applications 24a and 24b, no problem occurs because of that vulnerability. As a result, tight security can be maintained over a long period of time, without introducing corrective patches to correct vulnerabilities of the operating system and the application.

Second Embodiment

Figure 6:
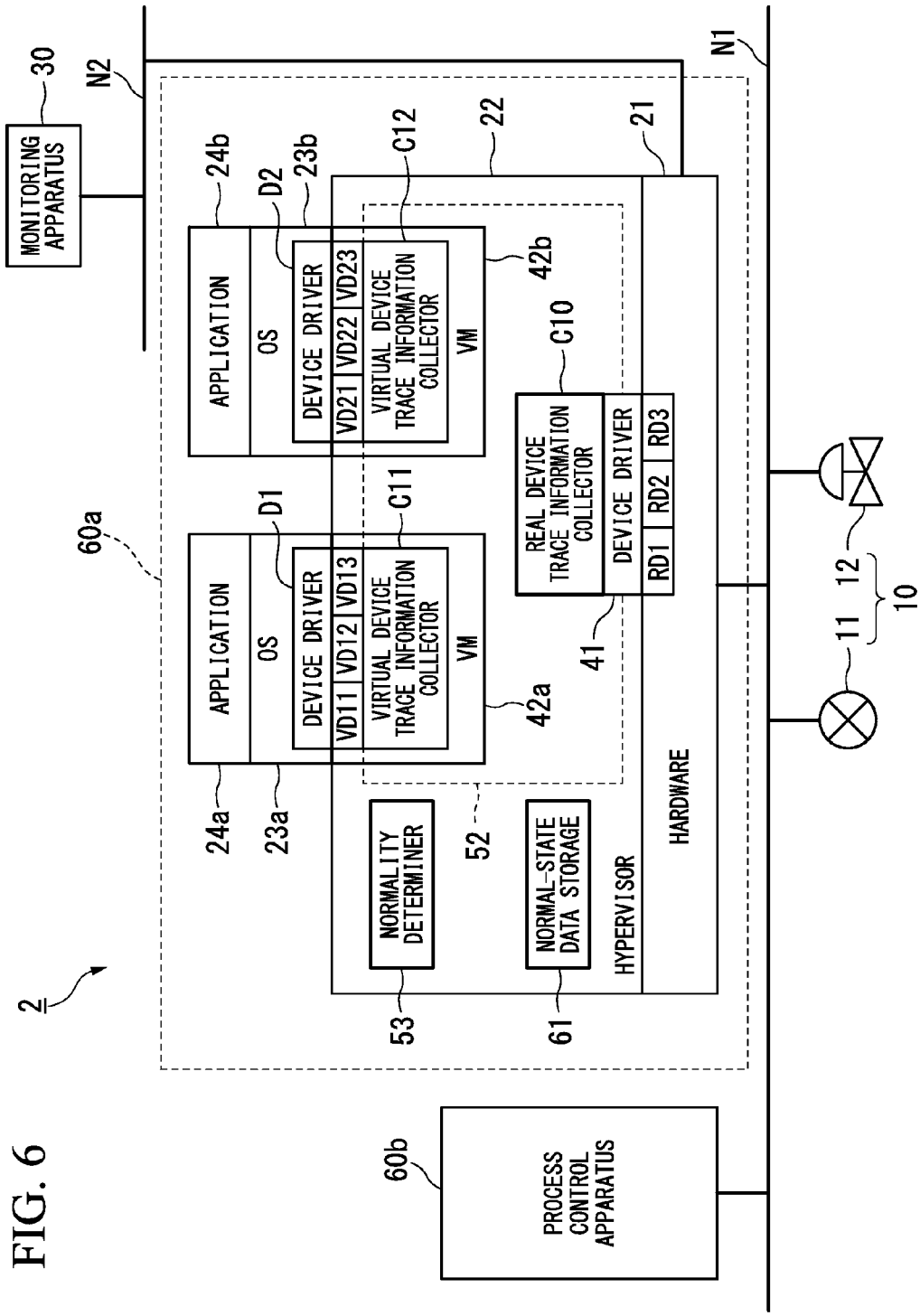
FIG. 6 is a block diagram showing the main parts of the constitution of a process control system according to a second embodiment of the present invention.

FIG. 6 is a block diagram showing the main parts of the constitution of a process control system according to the second embodiment of the present invention. In FIG. 6, elements that are the same as ones shown in FIG. 1 are assigned the same reference numerals. As shown in FIG. 6, a process control system 2 of the second embodiment, in place of the process control apparatuses 20a and 20b in FIG. 1, has process control apparatuses 60a and 60b.

The process control apparatuses 60a and 60b have a normal-state data storage 61 (storage) in place of the operation model definer 51 provided in the process control apparatuses 20a and 20b shown in FIG. 1, enabling a determination of the normality of the operating of the process control apparatuses 60a and 60b, without creating the operation model of the first embodiment. In the following, to simplify the description, the description will use the process control apparatus 60a as an example.

When the process control apparatus 60a is in the normal state, the normal-state data storage 61 provided in the process control apparatus 60a stores traces of interactive motions between the hardware 21 and the operating systems 23a and 23b (normal-state data: first data). The process control apparatus 60a being in a normal state, similar to the case of the process control apparatus 20a of the first embodiment being in a normal state, refers to the state in which, for example, the process control apparatus 60a is not under a cyberattack, there is no unauthorized access from the process control apparatus 60a to other apparatuses, and the process control apparatus 60a is operating normally.

FIG. 7 is a table showing an example of normal-state data in the second embodiment of the present invention. The normal-state data shown in FIG. 7 are for the case in which operation the same as the periodic execution shown in FIG. 3 is performed. The normal-state data shown by examples in FIG. 7 is made up of "input/output direction", "target for system call", "devices used in apparatus", "collection time", and "collection location". The "input/output direction", "target for system call", "devices used in apparatus", and "collection time" are the same as those shown in FIG. 5. However, whereas the "devices used in apparatus" in FIG. 5 specified a plurality of devices, the "devices used in apparatus" of FIG. 7 specifies only one device. The "collection location" is information indicating the location at which the normal-state data was collected.

For example, the normal-state data d1, d2, d7, and d8 in FIG. 7 are data collected in the case in which data is transmitted (output) to the valve apparatus 12 from the application 24a, and the normal-state data d3 and d4 are data collected in the case in which data is transmitted (output) to the monitoring apparatus 30 from the application 24a. The normal-state data d5 and d6 are data collected when data is received from the process control apparatus 60b.

Specifically, the normal-state data d1 is data indicating that information indicating that "input/output direction" is output, that "target for system call" is the valve apparatus 12, and that the "devices used in apparatus" is the virtual device VD13 was collected by the virtual device trace information collector C11 at the time 00:00'00"00. The normal-state data d2 is data indicating that information indicating that "input/output direction" is output, that "target for system call" is the valve apparatus 12, and that "devices used in apparatus" is the device RD2 was collected by the real device trace information collector C10 at the time 00:00'00"30.

Next, the operation of the process control system 2 having the above-noted constitution will be described. FIG. 8 is a flowchart for describing the general operation of a process control apparatus provided in a process control system according to the second embodiment of the present invention. First, as shown in FIG. 8, when the process control apparatus 60a is in the normal state, execution is performed to acquire the normal-state data and store the normal-state data into the normal-state data storage 61 (step S21: first step).

Specifically, the process control system 2 shown in FIG. 6 is started in the condition in which the field network N1 and the control network N2 are isolated from a network that could possibly come under cyberattack. When a cyberattack is not being made, the traces of interactive motions between the hardware 21 of the process control apparatus 60a and the operating systems 23a and 23b are acquired as normal-state data and stored into the normal-state data storage 61. When the storage of the normal-state data is completed, the stored normal-state data is made read-only data, and the field network N1 and the control network N2 are returned to the state before they were isolated.

When the above-noted execution is completed, similar to the first embodiment, the trace information collector 52 of the process control apparatus 60a performs execution to collect traces of interactive motions between the hardware 21 and the operating system 23a when the application 24a is running (step S22: second step). The normality determiner 53 then compares the normal-state data stored in the normal-state data storage 61 with the information collected by the trace information collector 52 and determines the normality of the process control apparatus 60a (step S23: third step).

Specifically, the normality determiner 53 performs execution (pattern-matching) to compare, in time sequence, the normal-state data stored in the normal-state data storage 61 with the information collected by the trace information collector 52. If there is a match between the contents and the time sequence, the normality determiner 53 determines that the process control apparatus 60a is in a normal state. In contrast, if at least one of the contents and the time-sequence order does not match, the normality determiner 53 determines that the process control apparatus 60a is in an abnormal state. If the determination is made that the process control apparatus 60a is in an abnormal state, execution is done, similar to the first embodiment, to discard the data and to give notification to that effect to the monitoring apparatus 30. Thereafter, the process control apparatus 60a repeats the execution of steps S22 and S23.

FIG. 9 is a table showing an example of information collected by a trace information collector in the second embodiment of the present invention. As shown in FIG. 9, the information collected by the trace information collector 52, similar to the normal-state data shown in FIG. 7, is made up of "input/output direction", "target for system call", "devices used in apparatus", "collection time", and "collection location". Comparing the normal-state data shown in FIG. 7 with what is shown in FIG. 9, it can be seen that the data corresponding to the normal-state data d6 in FIG. 7 (data which would be disposed between the data d15 and the data d16 in FIG. 9) is missing from FIG. 9. For this reason, when the information shown by the examples of FIG. 9 is collected, the normality determiner 53 determines that the communication of the process control apparatus 60a with the process control apparatus 60b is abnormal.

As described above, in the second embodiment, when the process control apparatus 60a is in a normal state, the traces of interactive motions between the hardware 21 and the operating system 23a are acquired as the normal-state data, the normal-state data is compared with the information collected by the trace information collector 52 (traces of interactive motions between the hardware 21 and the operating system 23a), and the normality of the operating of the process control apparatus 60a is determined Based on the determination result, execution is performed to, for example, discard the data. For this reason, no problem occurs because of improper actions that take advantage of a vulnerability, similar to the first embodiment. Thus, security can be maintained over a long period of time, without introducing corrective patches to correct vulnerabilities of the operating system and the application.

Also, in the second embodiment, because when the process control apparatus 60a is in a normal operating state the traces of interactive motions between the hardware 21 and the operating system 23a are acquired as normal-state data, the task of creating an operation model can be omitted. Because more diverse patterns can be used than in the case of using an operation model, a determination can be made with greater accuracy than in the first embodiment.

Third Embodiment

Figure 10:
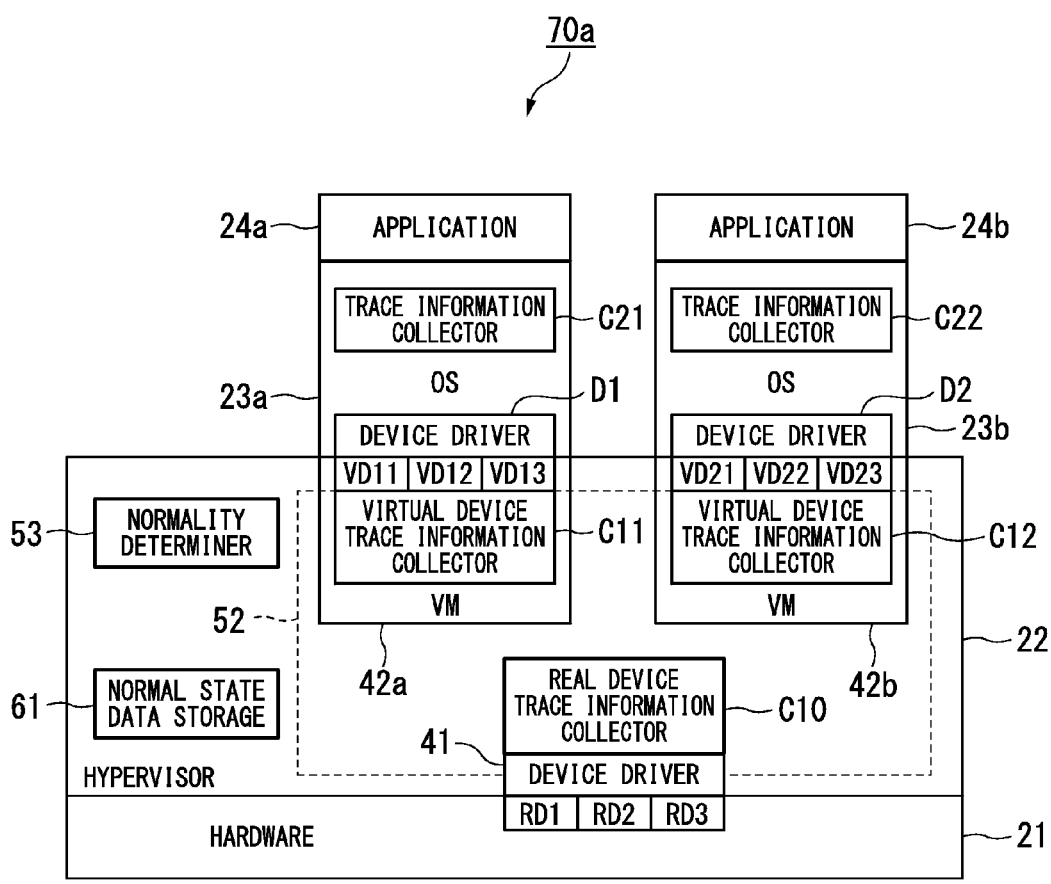
FIG. 10 is a block diagram showing the main parts of the constitution of a process control apparatus according to a third embodiment of the present invention.

FIG. 10 is a block diagram showing the main parts of the constitution of a process control apparatus provided in a process control system according to the third embodiment of the invention. In the overall constitution of the process control system of the third embodiment, the process control apparatuses 70a and 70b are provided (the illustration of the process control apparatus 70b being omitted) in place of the process control apparatuses 60a and 60b provided in the process control system 2 shown in FIG. 6. In FIG. 10, elements corresponding to ones in the constitution shown in FIG. 6 are assigned the same reference numerals.

As shown in FIG. 10, the process control apparatus 70a provided in the process control system of the third embodiment has the addition of trace information collectors C21 and C22 (second collectors) to the operating systems 23a and 23b of the process control apparatus 60a shown in FIG. 6. The process control apparatus 70a with this constitution, in addition to enabling a determination with better accuracy than the process control apparatus 60a shown in FIG. 6, even when performing execution that is not periodic execution (that is, aperiodic execution), enables determination of the normality of the operating of the process control apparatus 70a.

The trace information collector C21 collects traces of interactive motions between the operating system 23a and the application 24a and the trace information collector C22 collects traces of interactive motions between the operating system 23b and the application 24b. The traces of interactive motions collected by the second collectors include system call information with respect to the operating system as application execution, for example, and the type of system call that is made. The data collected by the trace information collectors C21 and C22 is output, together with the data collected by the trace information collector 52, to the normal-state data storage 61 or the normality determiner 53 of the hypervisor 22.

Specifically, the data collected by the trace information collectors C21 and C22 when the process control apparatus 70a is in a normal state is stored, together with the data collected by the trace information collector 52, in the normal-state data storage 61 as normal-state data. After the storage of the normal-state data into the normal-state data storage 61, the normality determiner 53 compares the normal-state data with the data collected by the trace information collectors C21 and C22 with the data collected by the trace information collector 52.

Figure 11:
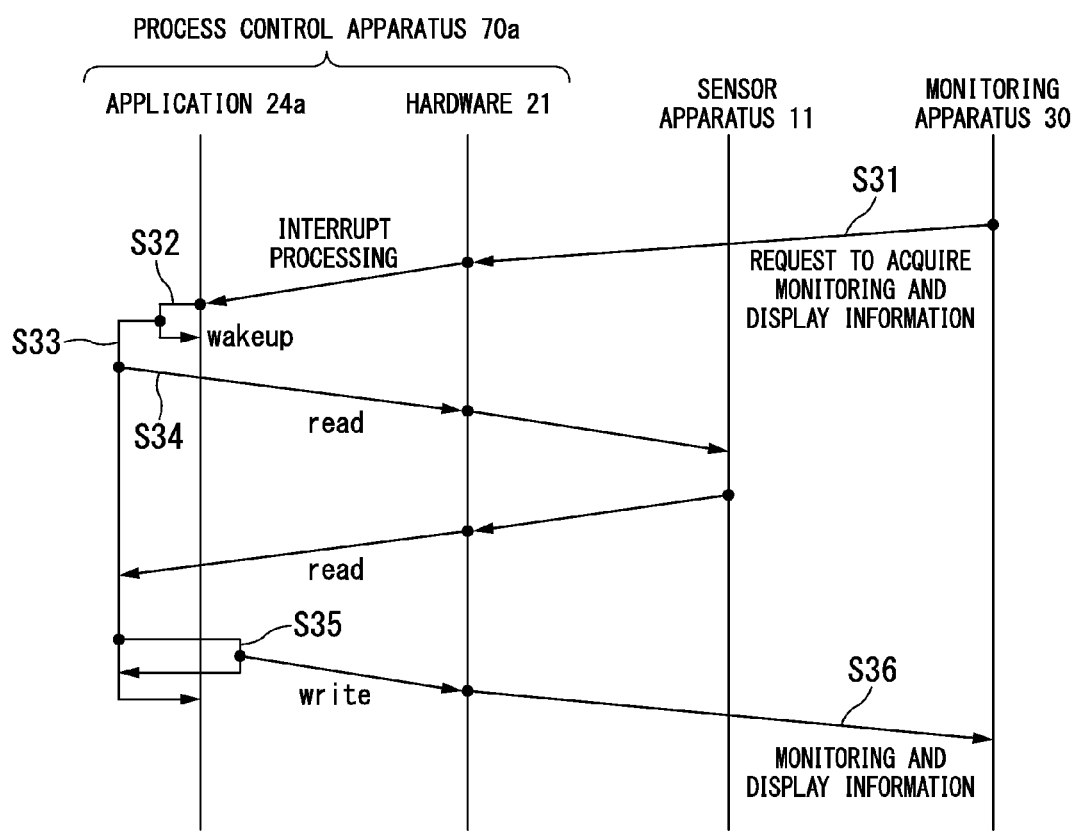
FIG. 11 is a drawing showing an example of aperiodic execution of a process control system performed in the third embodiment of the present invention.

Next, the operation in the case in which the process control apparatus 70a having the above-noted constitution performs aperiodic execution will be described. The operation when the process control apparatus 70a performs aperiodic execution is basically the same as when the process control apparatus 70a performs periodic execution. FIG. 11 is a drawing showing an example of aperiodic execution of the process control system performed by the third embodiment of the present invention. The aperiodic execution shown in FIG. 11 is done when the monitoring apparatus 30 monitors the control of a plant process and performs operation to collect information (monitoring and display information) to perform monitoring and display.

Specifically, when a request to acquire monitoring and display information is asynchronously transmitted from the monitoring apparatus 30 to the process control apparatus 70a (step S31), the process control apparatus 70a performs receiving execution to receive the acquisition request for monitoring and display information (step S32) and generation execution to generate monitoring and display information (step S33), and, during the generation execution, performs acquisition execution to acquire measurement data from the sensor apparatus 11 (step S34) and transmission execution to transmit the monitoring and display information (step S35).

In the above-noted receiving execution (step S32), a request to acquire monitoring and display information received by the hardware 21 and routed through the device RD3 and the virtual device VD11 is notified by interrupt execution to the application 24a from the operating system 23a. The receiving of the notification by the application 24a is done, for example, by an interrupt handler or a signal handler.

Upon receiving the notification, the application 24a uses a system call (for example, of IPC (interprocess communication)) to wake up the generation execution (step S33) corresponding to the acquisition request. In the generation execution, the application 24a generates monitoring and display information, using measurement data acquired in the acquisition execution (step S34). The generated monitoring and display information is output to outside the process control apparatus 70a by the transmission execution (step S35).

In the above-noted acquisition execution (step S34), the application 24a makes a system call and outputs a data read request to the operating system 23a. Based on this data read request, measurement data is acquired from the sensor apparatus 11, via the virtual device VD12 and the device RD2. In the above-noted transmission execution (step S35), the application 24a makes a system call and outputs a data write request to the operating system 23a. Based on this data write request, monitoring and display information is output via the virtual device VD11 and the device RD3. The monitoring and display information output from the process control apparatus 70a is transmitted to the monitoring apparatus 30 via the control network N2 (step S36).

FIG. 12 is a table showing an example of information collected by a trace information collector in the third embodiment of the present invention. The information shown in FIG. 12 is information collected by the trace information collector 52 and the trace information collector C21 when the asynchronous execution shown in FIG. 11 is performed. This information records the devices used in the apparatus, together with the type of system call and the target, which the system call affect, as system call used in the apparatus. When such information is collected, similar to the second embodiment, the normality determiner 53 compares the information with the normal-state data stored in the normal-state data storage 61 and determines the normality of the process control apparatus 70a. If the process control apparatus 70a is determined to be in an abnormal state, execution is done, similar to the second embodiment, to discard the data and to give notification to that effect to the monitoring apparatus 30.

As described above, in the third embodiment, when the process control apparatus 70a is in a normal state, the traces of interactive motions between the hardware 21 and the operating system 23a and the traces of interactive motions between the operating system 23a and the application 24a are acquired as normal-state data. The normal-state data is compared with information collected by the trace information collector 52 and by the trace information collector C21, and the normality of the operating state of the process control apparatus 70a is determined. Based on this determination, execution is performed to, for example, discard the data. For this reason, similar to the second embodiment, tight security can be maintained over a long period of time, without introducing corrective patches to correct vulnerabilities of the operating system and the application.

In the third embodiment, in addition to the traces of interactive motions between the hardware 21 and the operating system 23a, traces of interactive motions between the operating system 23a and the application 24a are collected as normal-state data. For this reason, interactive motions between the operating system 23a and the application 24a can be associated with interactive motions between the hardware 21 and the operating system 23a by the flow of asynchronous execution. The normality of the asynchronous execution of the application 24a or the operating system 23a can be verified based on whether this associated data is equal to that in the normal-state. Doing this enables determination of the normality of the operating of the process control apparatus 70a even in aperiodic execution.

In the third embodiment, although to facilitate understanding, the description uses the case of the second collector collecting the type of system call made, information such as the type or value of an argument used in making a system call and the return point of the system call may additionally be collected as system call information and used for determination of normality.

In the third embodiment, the timing of exchange of information between an application and an operating system is taken to be a system call. Because an application must make a system call to perform its own execution, this has the effect of eliminating the need for special modifications or functional additions to handle application tracing by taking the timing as the system call.

In the third embodiment, the second collector is added to the operating system. If the changes in an operating system and an application are undesirable, a second collector may be implemented between an operating system and an application. For example, a second collector may be implemented as a library, which has the same interface as that of a system call and performs a relay to the system call. In any of these cases, the determining of normality can be made more detailed by adding the operation tracing of the application. For example, when a determination is made that the process control apparatus is in an abnormal state, a further determination can be made as to whether the abnormal state is caused by the operation system or the application.

In the above-described second and third embodiments, when storing normal-state data into the normal-state data storage 61, the storage may be done after separately defining a range of time error with respect to the "collection time" of the normal-state data within which matching will be determined (for example, ±10%, 1.9 sec to 2.1 sec).

Fourth Embodiment

Figure 13:
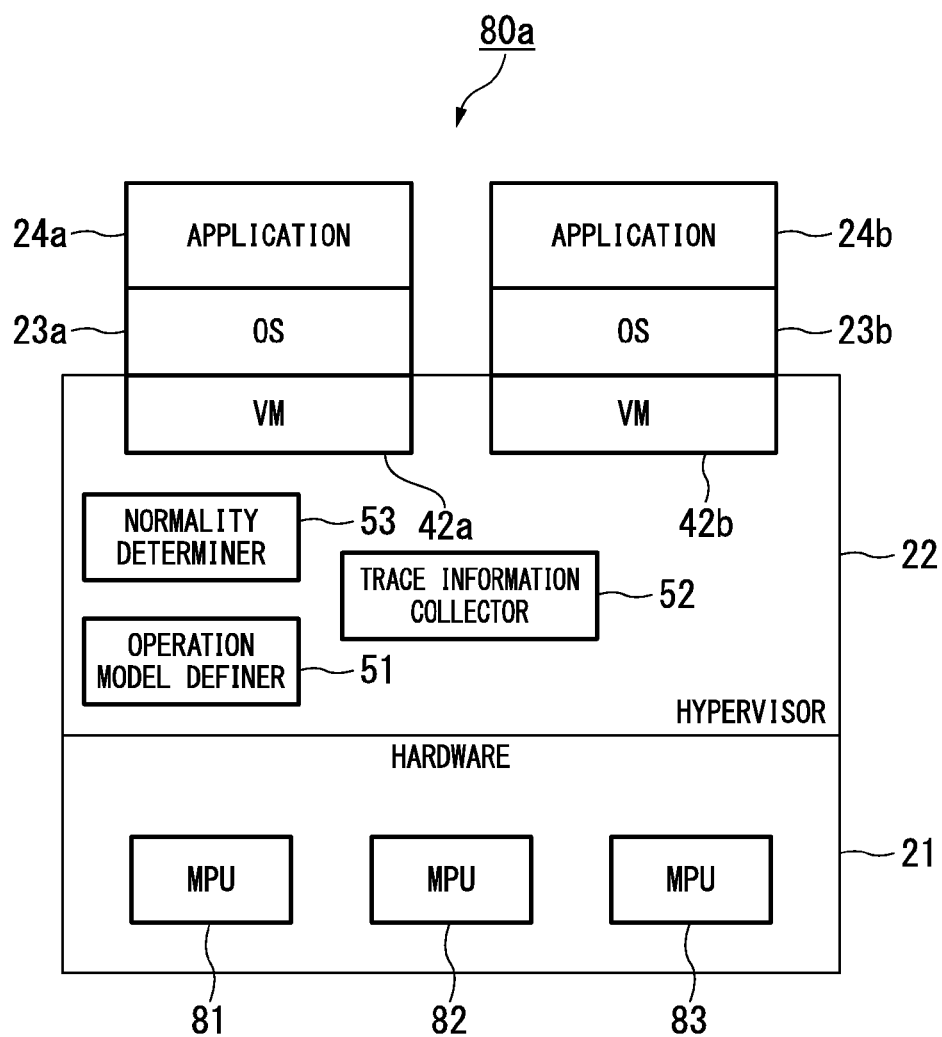
FIG. 13 is a block diagram showing the general constitution of a process control apparatus according to a fourth embodiment of the present invention.

FIG. 13 is a block diagram showing the general constitution of a process control apparatus provided in a process control system according to the fourth embodiment of the present invention. In the overall constitution of the process control system of the fourth embodiment, the process control apparatuses 80a and 80b are provided (the illustration of the process control apparatus 80b being omitted) in place of the process control apparatuses 20a and 20b provided in the process control system 1 shown in FIG. 1. In FIG. 13, elements corresponding to ones in the constitution shown in FIG. 1 are assigned the same reference numerals.

As shown in FIG. 13, the process control apparatus 80a provided in the process control system of the fourth embodiment has the hardware 21 of the process control apparatus 20a shown in FIG. 1 as the hardware 21, provided with a plurality of MPUs 81 to 83 (processors). The MPUs 81 to 83 refer to processor cores, each of which may be implemented in individual packages (single cores) or, alternatively, all may be implemented in a single package (multicore).

The functions of the process control apparatus 80a in the fourth embodiment are implemented by one of the MPUs 81 to 83 executing a program for implementing each of the functions. For example, the hypervisor 22 (including the operation model definer 51, the trace information collector 52, and the normality determiner 53) is implemented by the MPU 81 executing a program for implementation thereof. The operating system 23a and the application 24a are implemented by the MPU 82 executing a program for the implementation thereof, and the operating system 23b and the application 24b are implemented by the MPU 83 executing a program for the implementation thereof. The allocation of the MPUs 81 to 83 that are caused to execute the programs can be done, for example, by the hypervisor 22.

By having the plurality of MPUs 81 to 83 execute programs to implement the various functions of the process control apparatus 80a in this manner, even if the process control apparatus 80a comes under a DoS (denial of service) attack, it is possible to prevent a deterioration of performance or a stoppage of service by the process control apparatus 80a. That is, because the hypervisor discards unauthorized packets using the MPU 81 for a DoS attack, and the burden on the MPUs 82 and 83 that perform execution of the application 24a and the like does not increase, no deterioration of performance or the like occurs to the process control apparatus 80a.

The above-described process control apparatus 80a has the hardware 21 of the process control apparatus 20a of the first embodiment shown in FIG. 1 as the hardware 21 provided with the plurality of MPUs 81 to 83. Similarly, the hardware 21 of the process control apparatus 60a in the second embodiment shown in FIG. 6 and the process control apparatus 70a of the third embodiment shown in FIG. 10 may also be provided with the plurality of MPUs 81 to 83.

Although the foregoing has been a description of a process control apparatus and system and a method for determining the normality thereof according to embodiments of the present invention, the present invention is not limited to the above-described embodiments, and can be freely modified within the scope of the present invention. For example, whereas the above-described embodiments have been described for examples in which the hypervisor 22 implements a virtual environment causing a plurality of operating systems and applications to run on the process control apparatuses 20a, 60a, 70a, and 80a, the means to implement such a virtual environment is not limited to the hypervisor 22. For example, the virtual environment may be implemented by hardware.

Also, whereas the above embodiments have been described for an example in which the field apparatuses 10 can digitally communicate via the field network N1, field apparatuses that input and output analog signals may be used. If such field apparatuses are used, an I/O node that performs a conversion between the signals (analog signals) input and output by the field apparatuses and the signals (digital signals) communicated via the field network N1 is connected to the field network N1, and the I/O node and the field apparatuses can be connected by an analog transfer path (for example, a transfer line used to transfer 4-to-20-mA signals).

The above-described embodiments have been described regarding a constitution in which the operation model definer 51 (normal-state data storage 61), the trace information collector 52, and the normality determiner 53 were provided in the hypervisor 22. However, these may be provided in each of the virtual machines 42a and 42b. The operation model definer 51 (normal-state data storage 61) may be provided, for example, in a storage apparatus such as hard-disk recording apparatus or a semiconductor memory.

In the second and third embodiments, the description has been for an example in which, when the process control apparatuses 60a and 70a are in a normal state, the normal-state data is acquired beforehand. However, even after acquisition of the normal-state data, the normal-state data may be acquired (additionally acquired). This enables determination of normality without problems even if the behavior of the applications 24a and 24b running on the process control apparatuses 60a and 60b changes because of a change of the system constitution or the setting of the application.

Also, although to facilitate understanding of the above-described first, second, and third embodiments, the descriptions have been for the case in which the virtual devices VD11 to VD13 and real devices RD1 to RD3, and the virtual devices VD21 to VD23 and real devices RD1 to RD3 each have a one-to-one correspondence, depending upon the design of the virtual devices, constitutions in which one virtual device is made to correspond to a plurality of real devices and in which a plurality of virtual devices are made to correspond to one real device can also be envisioned. Even in such a constitution, trace information corresponding to the virtual devices and the real devices can be collected, and, similar to the cases of the above-described first, second, and third embodiments, the normality of the operating of the process control apparatus can be verified.

What is claimed is:

1. A process control apparatus that performs a control of an industrial process implemented in a plant, the process control apparatus comprising:
   a virtual device that operates on a hardware in place of hardware;
   a controller including an operating system that runs on the virtual device and an application that runs on the operating system and performs the control of the industrial process by a communication with a field apparatus which performs at least one of measurements and operations required for the control of the industrial process;
   a storage that stores normal operation information indicating an operation state in a normal state;
   a first collector that collects detailed information of industrial operations performed or transmitted between the hardware of the process control apparatus and the operating system installed on the process control apparatus when the application runs if communication is performed between the controller and outside thereof via the hardware; and
   a determiner that determines whether or not the operation state is normal by comparing the normal operation information stored in the storage with the information collected by the first collector,
   wherein the storage stores an operation model, which is information establishing operation specifications derived from specifications of the controller, or a first data, which is data transmitted between the controller and the hardware in the normal state, as the normal operation information, and
   the operation model and the first data includes at least one of information indicating input/output direction of data, information indicating a target that is transmitting or receiving data, and information indicating devices used through which data is transmitted during data input or output.

2. The process control apparatus according to claim 1, wherein the first collector includes a real device trace information collector that collects information transmitted between the hardware and the virtual device.

3. The process control apparatus according to claim 1, wherein the first collector includes a virtual machine that operates the operating system under a control of the virtual device, and
   the virtual machine includes a virtual device trace information collector that collects information transmitted between the operating system and the virtual device.

4. The process control apparatus according to claim 1, wherein the operation model and the first data further includes information indicating a time when data is received.

5. The process control apparatus according to claim 1, wherein at least the first collector and the determiner are provided in the virtual device.

6. A process control apparatus that performs a control of an industrial process implemented in a plant, the process control apparatus comprising:
   a virtual device that operates on a hardware in place of hardware;
   a controller including an operating system that runs on the virtual device and an application that runs on the operating system and performs the control of the industrial process by a communication with a field apparatus which performs at least one of measurements and operations required for the control of the industrial process;

a storage that stores second data, which is data transmitted between the operating system and the application in a normal state, as normal operation information indicating an operation state in the normal state;
a second collector that collects detailed information of industrial operations performed or transmitted between the operating system installed on the process control apparatus and the application of the process control apparatus; and
a determiner that determines whether or not the operation state is normal by comparing the second data stored in the storage as the normal operation information with the information collected by the second collector.

7. The process control apparatus according to claim 1, wherein if the determiner determines that the operation is not normal, the determiner notifies outside of a result of the determination.

8. The process control apparatus according to claim 1, wherein the hardware comprises a plurality of processors, and
the virtual device is implemented by executing a first program for implementing the virtual device using a first processor, and the controller is implemented by executing a second program for implementing the controller using a second processor, the first processor and the second processor being different from each other.

9. A process control system that performs a control of an industrial process implemented in a plant, the process control system comprising:
a network provided in the plant;
the process control apparatus according to claim 1, the process control apparatus being configured to be connected to the network; and
a field apparatus configured to be connected to the network and controlled by the process control apparatus.

10. The process control system according to claim 9, further comprising:
a monitoring apparatus configured to be connected to the network, the monitoring apparatus configured to receive a result of the determination indicating whether or not the operation state is normal from the process control apparatus via the network.

11. A method for determining a normality of a process control apparatus that performs a control of an industrial process implemented in a plant, the method comprising:
storing normal operation information indicating an operation state of the process control apparatus in a normal state, the process control apparatus comprising a controller including an operating system, which runs on a virtual device that operates on a hardware in place of hardware, and an application, which runs on the operating system and performs the control of the industrial process by a communication with a field apparatus which performs at least one of measurements and operations required for the control of the industrial process;
collecting detailed information of industrial operations performed or transmitted between the hardware of the process control apparatus and the operating system installed on the process control apparatus when the application runs if communication is performed between the controller and outside thereof via the hardware; and
determining whether or not the operation state is normal by comparing the normal operation information stored with the information collected,
wherein the normal operation information includes an operation model, which is information establishing operation specifications derived from specifications of the controller, or a first data, which is data transmitted between the controller and the hardware in the normal state, as the normal operation information, and
the operation model and the first data includes at least one of information indicating input/output direction of data, information indicating a target that is transmitting or receiving data, and information indicating devices used through which data is transmitted during data input or output.

12. A method for determining a normality of a process control apparatus that performs a control of an industrial process implemented in a plant, the method comprising:
storing second data, which is data transmitted between an operating system and an application in a normal state, as normal operation information indicating an operation state of the process control apparatus in the normal state, the process control apparatus comprising a controller including the operating system, which runs on a virtual device that operates on a hardware in place of hardware, and the application, which runs on the operating system and performs the control of the industrial process by a communication with a field apparatus which performs at least one of measurements and operations required for the control of the industrial process;
collecting detailed information of industrial operations performed or transmitted between the operating system installed on the process control apparatus and the application of the process control apparatus; and
determining whether or not the operation state is normal by comparing the second data stored as the normal operation information with the information collected.

* * * * *